United States Patent [19]
Ting

[11] Patent Number: 5,894,529
[45] Date of Patent: Apr. 13, 1999

[54] DESK-TOP THREE-DIMENSIONAL OBJECT SCANNER

[76] Inventor: Jack Ting, 8F-5, No. 6, Lane 609, Chung Hsing Rd., Sec. 5, Sanchung, Taipei, Taiwan

[21] Appl. No.: 08/959,017

[22] Filed: Oct. 28, 1997

[51] Int. Cl.[6] .................................. G06K 9/20; H04N 1/04
[52] U.S. Cl. ........................................... 382/312; 358/474
[58] Field of Search .................................. 358/474, 475, 358/482, 483, 487, 491, 492, 494, 496, 497, 479, 493, 500, 501, 505, 509; 355/67, 68, 82, 84, 231, 233, 234, 235, 52; 382/312

[56] References Cited

U.S. PATENT DOCUMENTS

| | | | |
|---|---|---|---|
| 4,302,097 | 11/1981 | Chlestil | 355/52 |
| 4,454,210 | 6/1984 | Ariyama | 430/31 |
| 4,910,601 | 3/1990 | Gerlach | 358/474 |
| 5,450,173 | 9/1995 | Bekanich | 355/228 |
| 5,636,030 | 6/1997 | Limbach | 356/386 |
| 5,659,404 | 8/1997 | Matsuda | 358/474 |
| 5,712,803 | 1/1998 | Lempirou | 364/560 |
| 5,757,519 | 5/1998 | Yoo | 358/474 |
| 5,764,383 | 6/1998 | Saund et al. | 358/497 |
| 5,774,237 | 6/1998 | Nako | 358/471 |

*Primary Examiner*—David K. Moore
*Assistant Examiner*—Jerome Grant
*Attorney, Agent, or Firm*—A & J

[57] ABSTRACT

A desk-top three-dimensional object scanner includes a camera body, a base, a retractable lever arm connecting the camera body and the base, and a compensation lighting device disposed at a bottom end of the lever arm. The camera body accommodates therein a sensor that employs lines as sensing points so that the image scanned has better resolution.

3 Claims, 5 Drawing Sheets

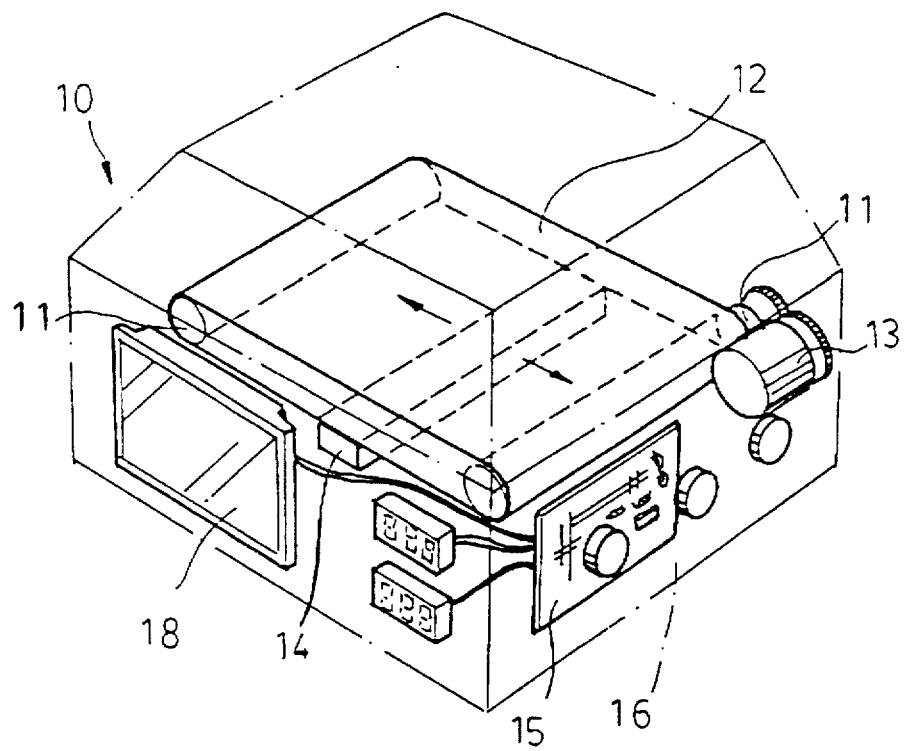
F I G. 4
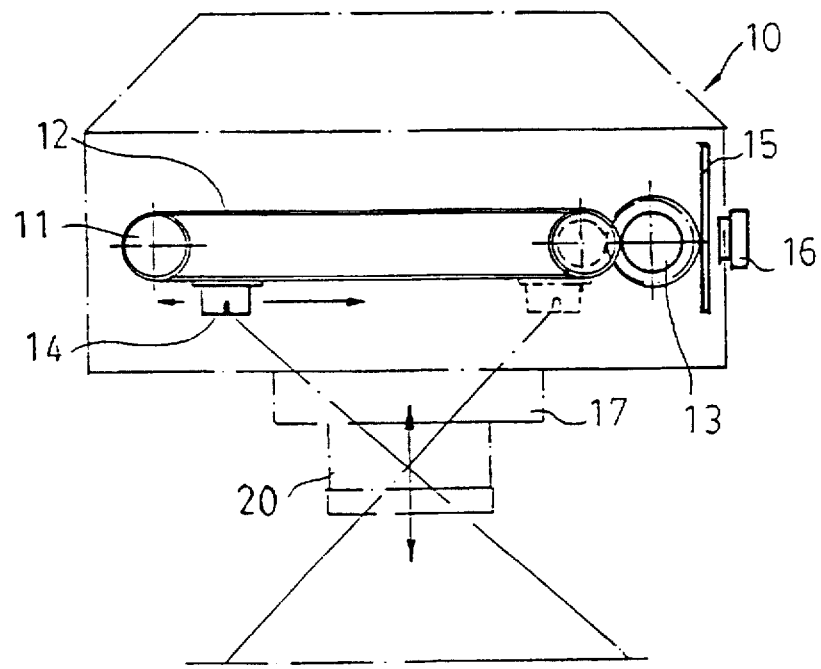
F I G. 5

DESK-TOP THREE-DIMENSIONAL OBJECT SCANNER

BACKGROUND OF THE INVENTION

1. Field of the Invention

This invention relates generally to a scanner, and more particularly to a three-dimensional object scanner that has enhanced scanning effects.

2. Description of the Prior Art

FIGS. 1 and 1A show a conventional scanner which utilizes lines as points of sensing. A document is put into the scanner and the contents are scanned in a memory to be processed by the computer.

FIG. 2 shows another conventional type of scanner, which utilizes surfaces as points of sensing and is capable of scanning three-dimensional objects. In use, a three-dimensional object is placed on a flat surface and, by means of "surface sensing," the image of the object is scanned into the memory to be processed by the computer.

These two types of scanners have individual problems. The first type of scanner is not capable of scanning three-dimensional objects and therefore cannot meet the demands of today's users. In the second type, as it uses surfaces as points of sensing, the resolution of the image obtained is not good and the words scanned cannot be processed by the computer. Besides, good models of scanners cost much.

SUMMARY OF THE INVENTION

This invention relates generally to a scanner, and more particularly to a three-dimensional object scanner that has enhanced scanning effects.

A primary object of the present invention is to provide a desk-top three-dimensional object scanner in which a CCD sensor is driven by a motor to scan an object of document placed on a planar surface, the motor requiring minimal electric power, and a small-size motor will suffice for driving purposes. Hence, the overall size of the scanner of the invention is very compact.

Another object of the present invention is to provide a desk-top three-dimensional object scanner in which standard view finder ring is mounted at a lower end of a camera body for locking therein a standard C-type lens of any angle so that the resolution of the image and the scope of scan are adjustable according to the angles of the lens.

A further object of the present invention is to provide a desk-top three-dimensional object scanner in which the scanner is provided with a light compensation device adapted to facilitate scanning of three-dimensional objects, documents, positive or negative prints.

Still another object of the present invention is to provide a desk-top three-dimensional object scanner in which the electronic control system is disposed in a camera body so that the overall size of the scanner is made more compact.

Yet another object of the present invention is to provide a desk-top three-dimensional object scanner in which the lens is freely changeable to allow change in resolution, so that the scanner may have signal outputs of VGA/XGA/200dpl/300dpl/400dpl/600dpl/-5000dpl.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numberals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 4 is a schematic view of the interior of the camera body of the present invention;

FIG. 5 is a schematic view of the CCD sensor of the present invention; and

DETAILED DESCRIPTION OF THE PREFERRED EMBODIMENT

Figure 1:
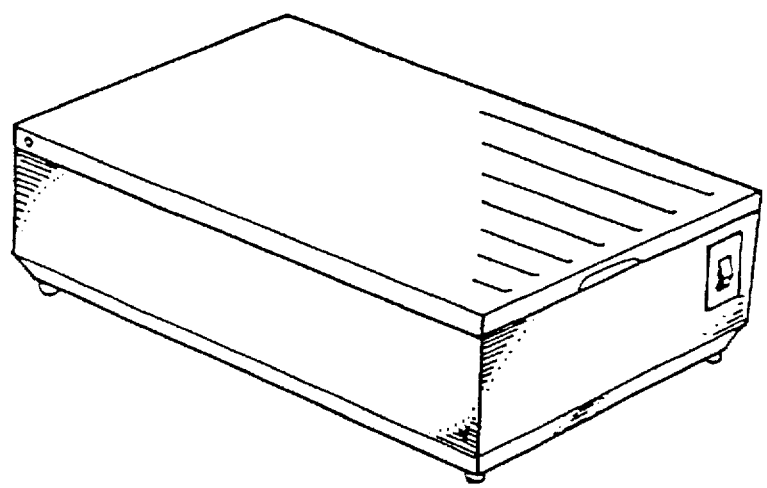
FIG. 1 is a perspective view of a conventional scanner.
Figure 1A:
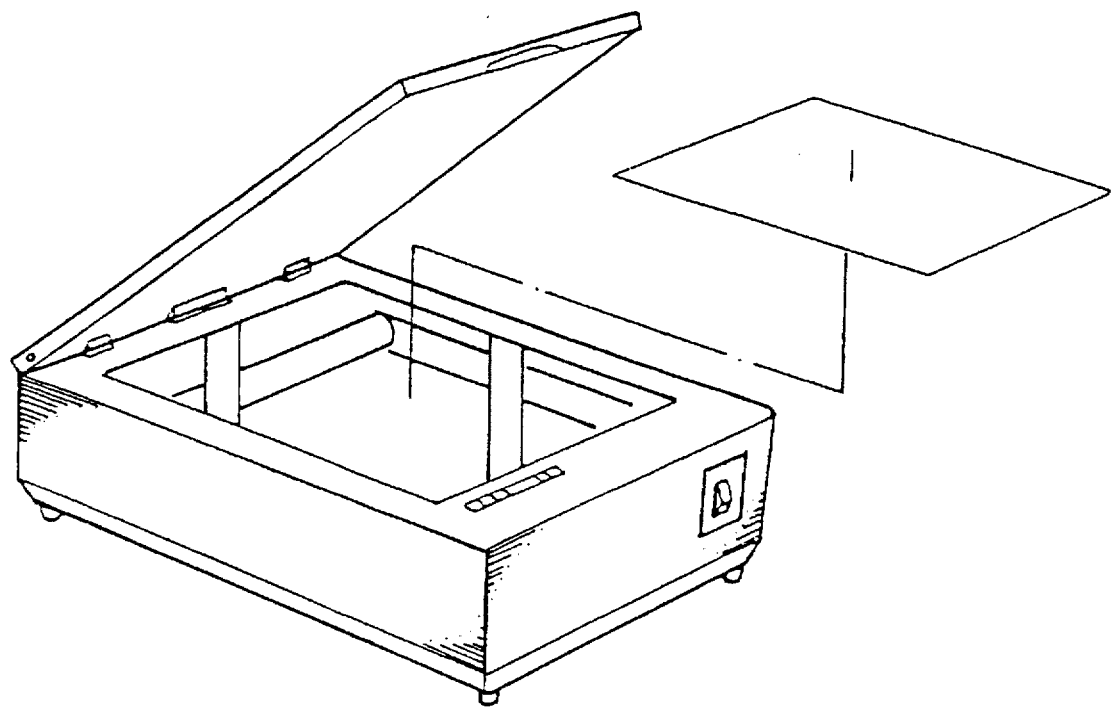
FIG. 1A illustrates the conventional scanner with its cover opened.
Figure 2:
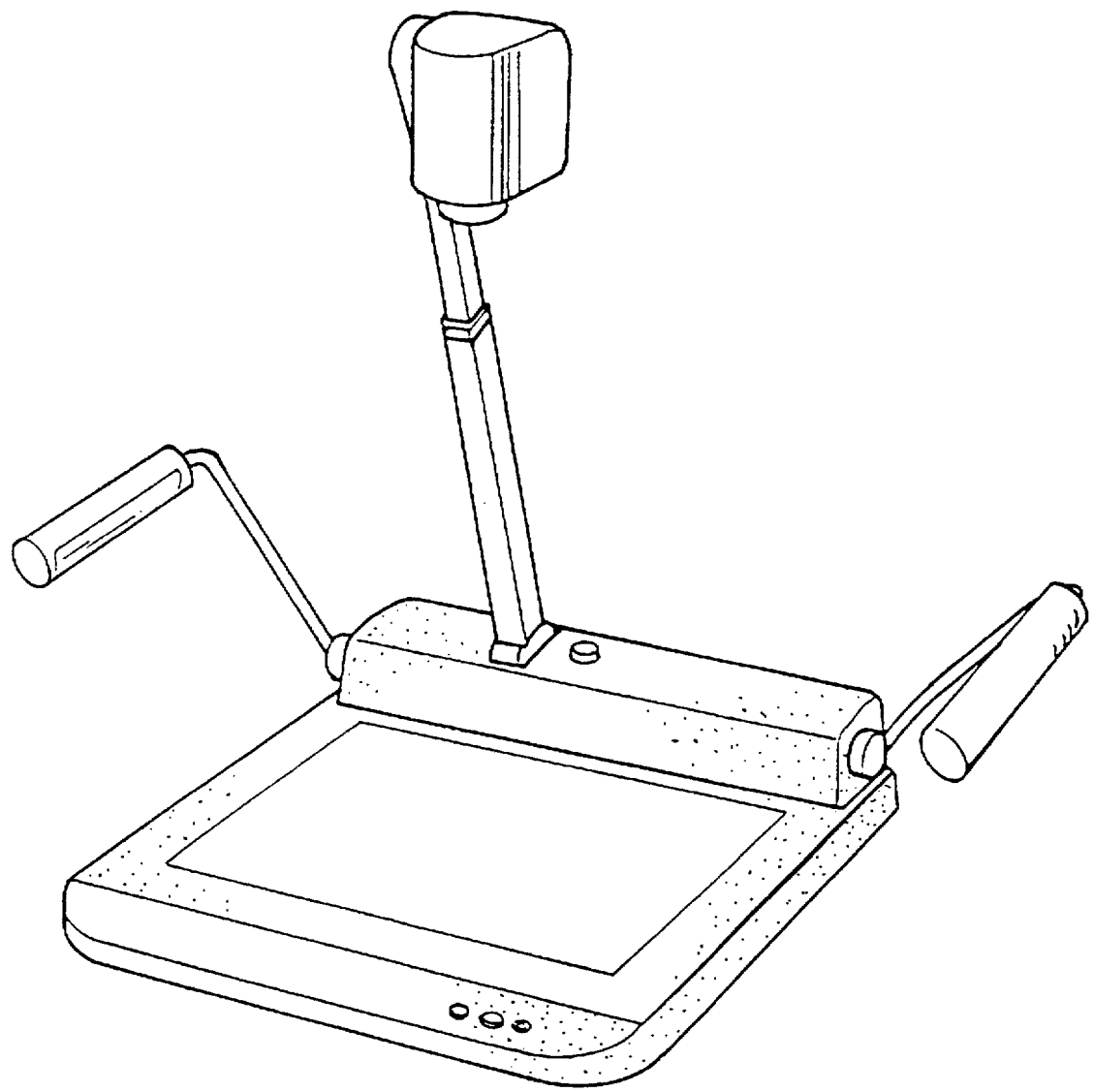
FIG. 2 is a schematic view of a conventional three-dimensional object scanner.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 3:
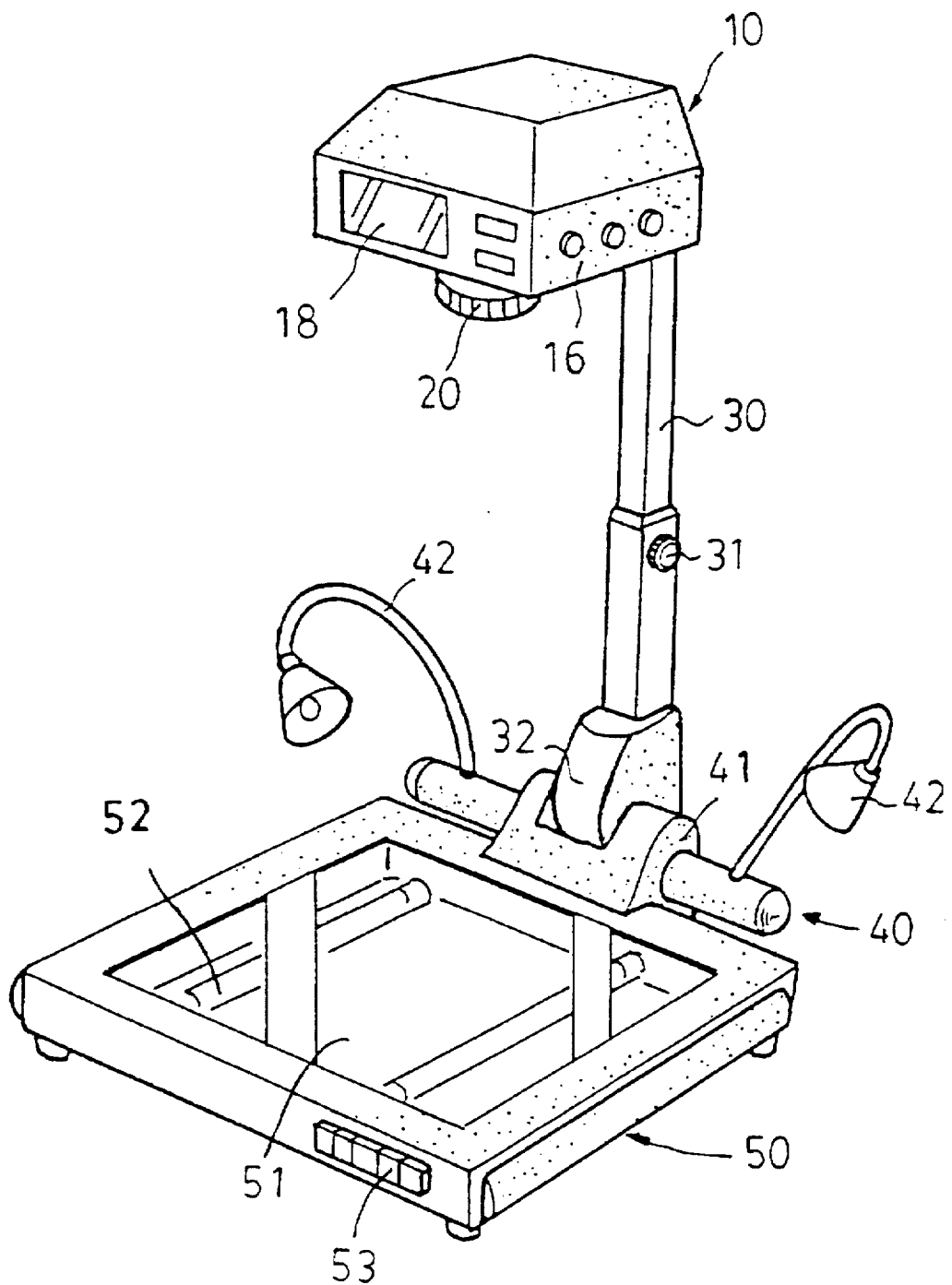
FIG. 3 is a perspective view of a preferred embodiment of the present invention.

With reference to FIGS. 3 and 4, the desk-top scanner according to the present invention essentially comprises a camera body 10, a view finder 20, a lever arm 30, and a base 50. The camera body 10 has an interior in which two rollers 11 are disposed. A conveyer belt 12 is mounted around the rollers 11, and a CCD sensor 14 is mounted below the conveyer belt 12. The CCD sensor 14 uses lines points of sensing so that the scanning effect is more positive. A motor 13 engages one of the rollers 11 via gear means. The motor 13 drives the rollers 11 to further drive the CCD 14 below the conveyer belt 12. An electrical circuit board is mounted on an inner wall of the camera body 10 near the motor 13. A control panel 16 is disposed on an outer surface of the camera body 10. The control panel 16 is provided with push buttons such as SCAN, STOP and RESOLUTION. A view finder ring 17 is installed at a lower end of the camera body 10 for locking therein view finders 20 of different angles. The retractable lever arm 30 is disposed at the outer surface of the camera body 10 at the lower end such that it does not interfere with the view finding by the view finder 20. The lever arm 30 is provided with an adjustment knob 31 by which the height or level of the view finder 20 is adjustable to obtain the desired image, and has a distal end 32. The compensation device 40 includes a lever seat 41 having an upper end pivotally connected to the distal end 32 of the lever arm 30. By means of pivotally connection, the lever arm 30 may be adjustably moved forwardly or rearwardly, bring the view finder 20 to move therewith. A compensation light 42 is disposed at either end of the lever seat 41. The base 50 has one side fixedly connected to a bottom end of the lever seat 41 of the compensation device 4. The base 50 has an upper surface which is a translucent planar surface 5 on which documents or three-dimensional objects may be placed. The base 50 has an interior in which a lighting device 52 is disposed. A plurality of control switches 53 are further provided at an outer surface of the base 50 for controlling the lighting device 52.

Reference is made to FIGS. 4 and 5, which respectively illustrate the operation of the CCD sensor and interaction between the CCD sensor and the view finder 20.

When the view finder 20 is extended downwardly, the scone of the entire view taken thereby will become smaller, but the resolution of the CCD sensor 14 will be better. This is same as the principle of photography and will not be discussed further hereinafter.

Figure 6:
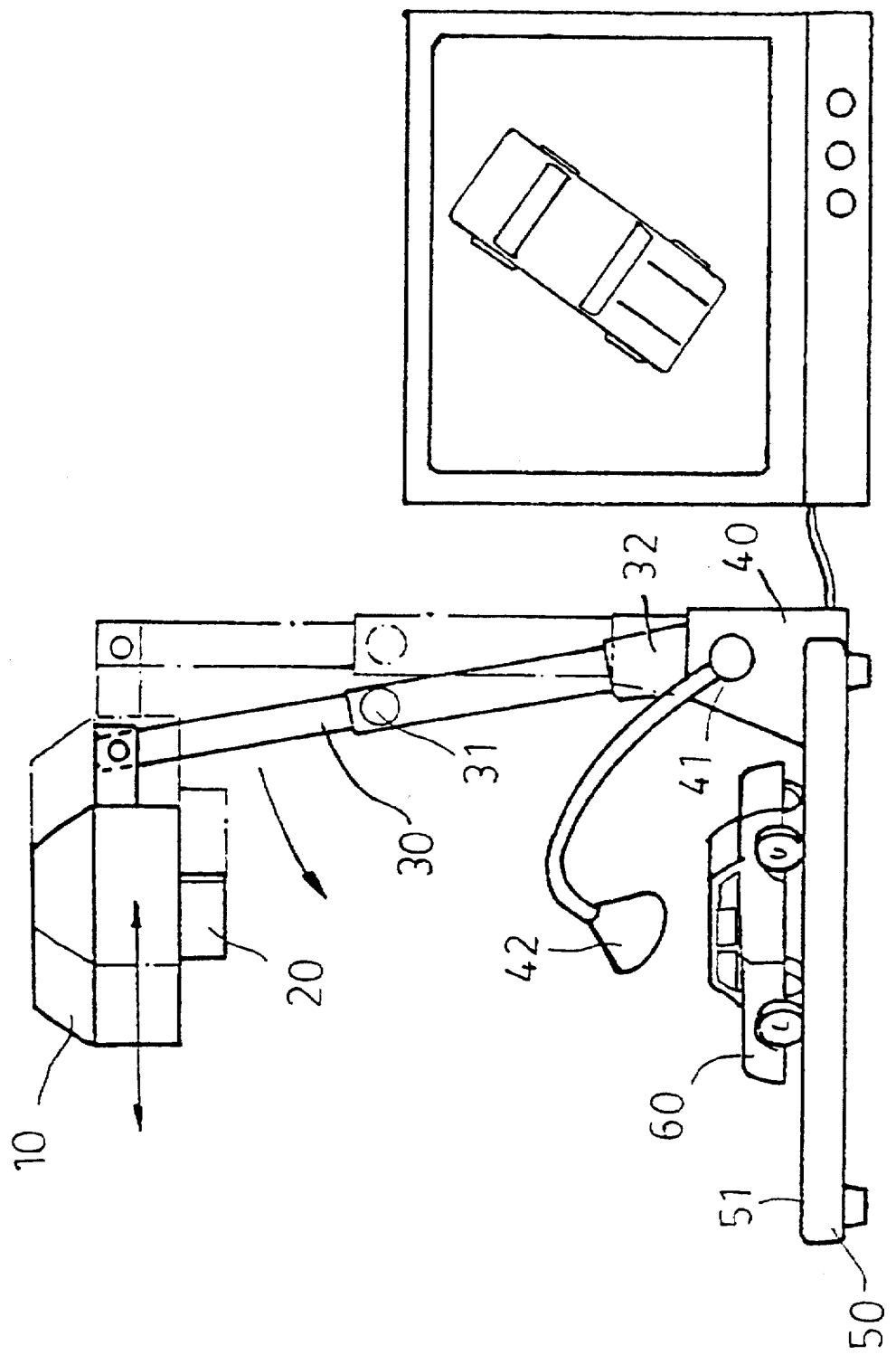
FIG. 6 is a schematic view illustrating the operation of the present invention.

Reference is made to FIG. 6. When a three-dimensional object 60 is placed on the translucent planar surface 51 of the base 50, and the compensation light 42 of the compensation device 40 is turned on, the user may view through an observation lens 18 on the outside of the camera body 10 to see if the view finder 20 has caught the entire image of the object 60. In the negative, the user may turn the adjustment knob 31 to adjust the height and position of the view finder 20. When it has been made sure that the object 60 is entirely within the view of the view finder 20, the user may press a push button such as RESOLUTION on the control panel 16 to select the operational basis for the operation. Then the user may press the necessary buttons such as SCAN and STOP to control the motor 13 to drive the CCD sensor 14. The image of the object 60 is then clearly stored in a memory device of the scanner or other signal register and can be played back. If the object to be scanned is a document, or a negative print, or a positive print, the lighting device 52 in the base 50 can be utilized to provide a back light for scanning purposes.

The scanner of the present invention is simple in construction and easy to assemble. It is also compact and portable.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A desk-top three-dimensional object scanner comprising:

a camera body, having an interior that has disposed therein two rollers, a conveyer belt mounted on said two rollers, a motor for driving said rollers and said conveyer belt, a CCD sensor mounted at a lower end of said conveyer belt, an electrical circuit board provided near said motor and adapted to control all circuit operations, a control panel and an observation lens mounted externally of said camera body at suitable positions, said motor being engaged to one of said rollers via gear means;

a view finder, connected to a lower end of said camera body;

a retractable lever arm, mounted to the lower end of said camera body at a suitable position such that said lever arm does not interfere with the view finding by said view finder, said lever arm having a distal end;

a compensation device, including a lever seat horizontally and pivotally provided at the distal end of said lever arm, and a plurality of compensation lights provided at both sides of said lever seat, said lever seat having a bottom end; and a base, fixedly connected to the bottom end of said lever seat of said compensation device, said base including a translucent planar surface at an upper side thereof and a lighting device disposed in an interior thereof, said base further having a plurality of control switches disposed externally thereof; whereby when a three-dimensional object or a document is placed on said translucent planar surface of said base, said compensation lights of said compensation device or said lighting device of said base may be used to provide sufficient light, and said motor is started to drive said rollers and said conveyer belt so as to drive the CCD sensor to displace side to side while said view finder scans the image of the object or document which is stored in a memory.

2. The desk-top scanner as claimed in claim 1, wherein said camera body is provided with a standard view finder ring at the lower end adapted to receive a standard C-type lens or zoom lens or view finder of any angles so as to enhance the functions of said scanner.

3. The desk-top scanner as claimed in claim 1, wherein said CCD sensor uses lines as points of sensing so that the scanning effect is more positive.

* * * * *